(No Model.) 9 Sheets—Sheet 1.

G. L. JAEGER.
EGG TRAY MACHINE.

No. 369,944. Patented Sept. 13, 1887.

WITNESSES:
Gabriel J. W. Bylster.
William Miller.

INVENTOR
Gustav L. Jaeger
BY
Van Santvoord & Hauff
ATTORNEYS (No Model.) 9 Sheets—Sheet 4.

G. L. JAEGER.
EGG TRAY MACHINE.

No. 369,944. Patented Sept. 13, 1887.

WITNESSES:
Gabriel J. W. Galsky.
William Miller

INVENTOR
Gustav L. Jaeger
BY
Van Santvoord & Hauff
ATTORNEYS

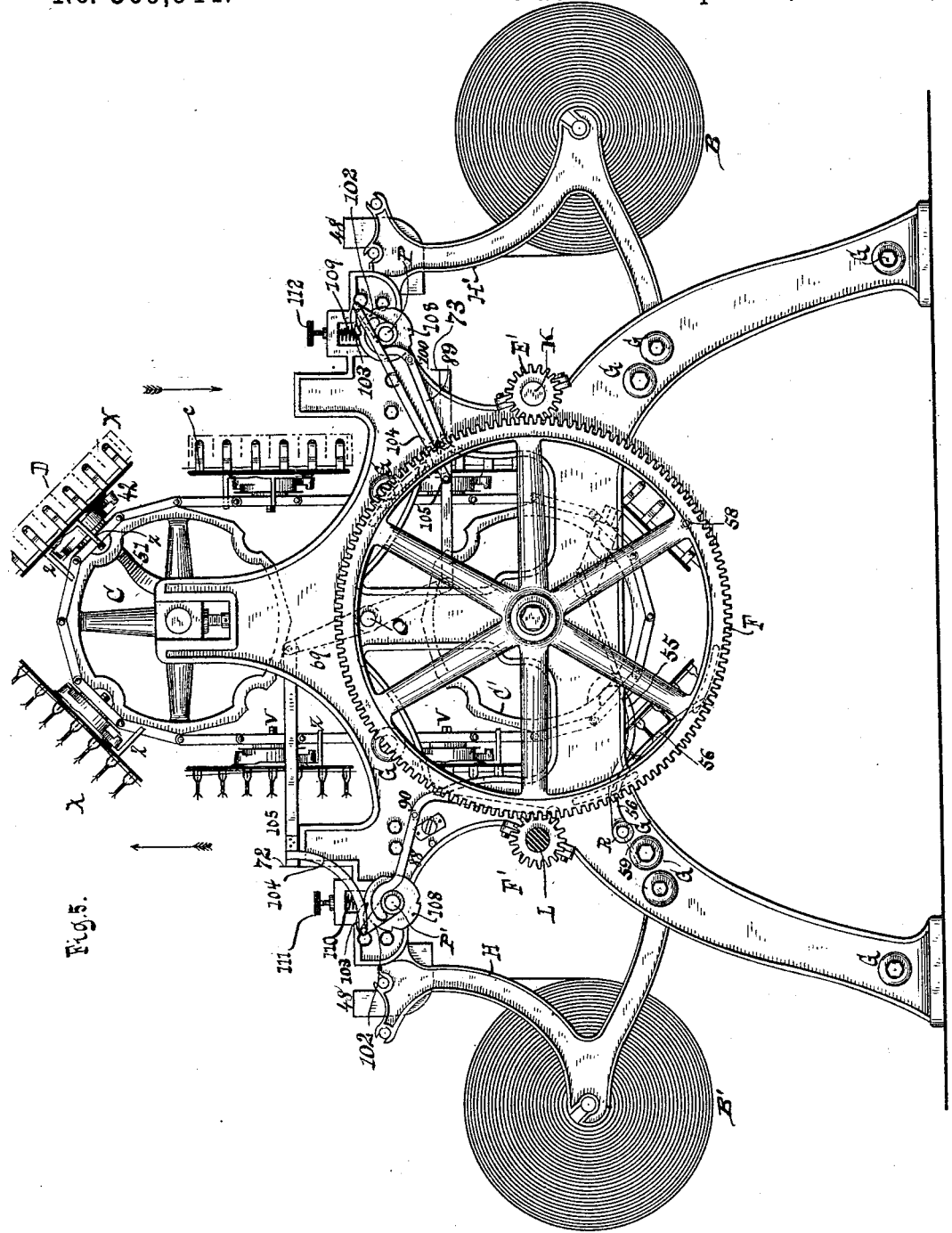

(No Model.) 9 Sheets—Sheet 6.
G. L. JAEGER.
EGG TRAY MACHINE.
No. 369,944. Patented Sept. 13, 1887.
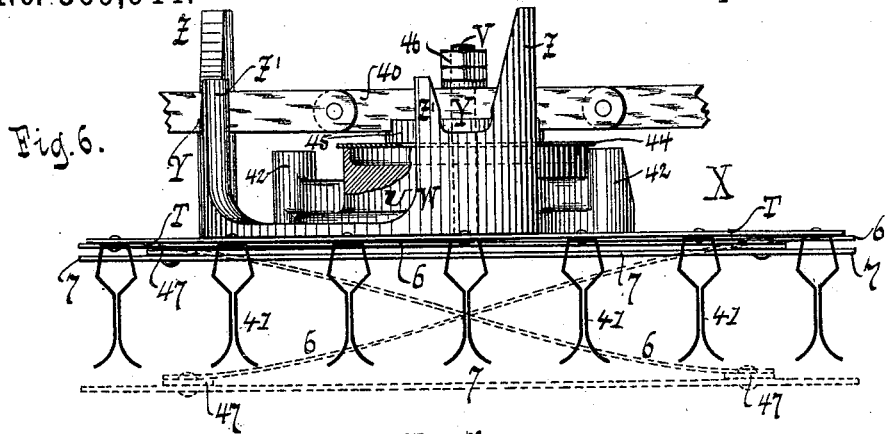
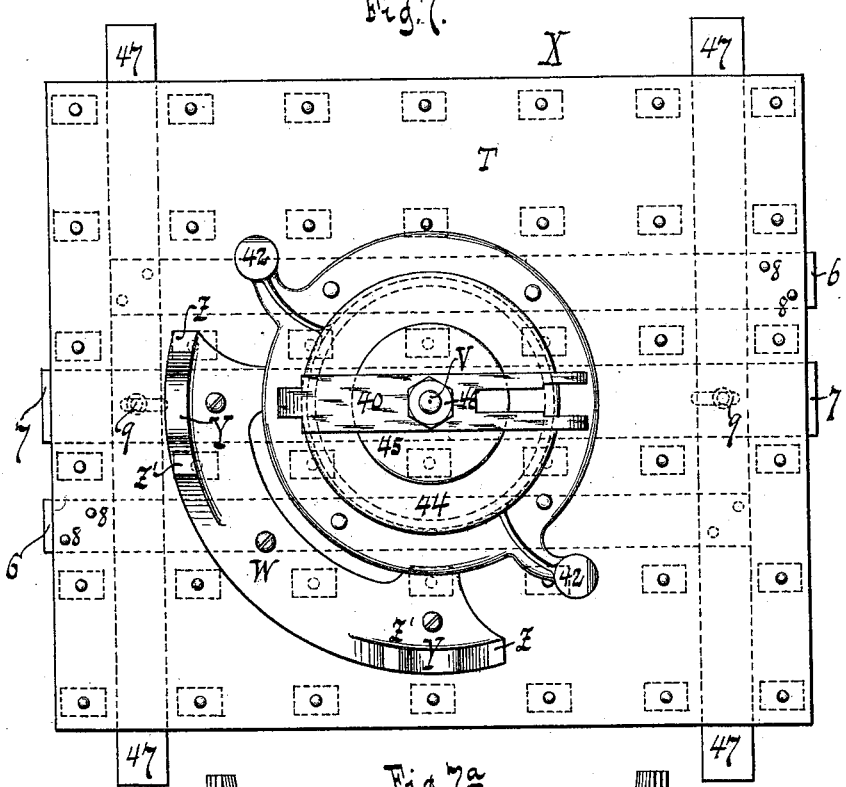
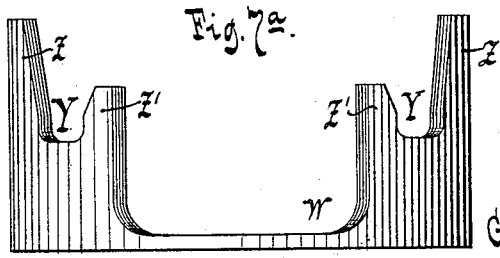
WITNESSES:
INVENTOR
Gustav L. Jaeger
BY
Van Santvoord & Hauff
ATTORNEYS (No Model.) 9 Sheets—Sheet 7.

G. L. JAEGER.
EGG TRAY MACHINE.

No. 369,944. Patented Sept. 13, 1887.

WITNESSES:
Gabriel J. W. Galster
William Miller

INVENTOR
Gustav L. Jaeger

BY Van Santvoord & Hauff
ATTORNEYS (No Model.)
9 Sheets—Sheet 8.
G. L. JAEGER.
EGG TRAY MACHINE.
No. 369,944. Patented Sept. 13, 1887.
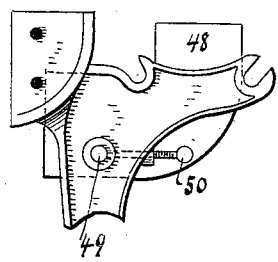
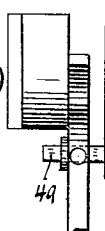
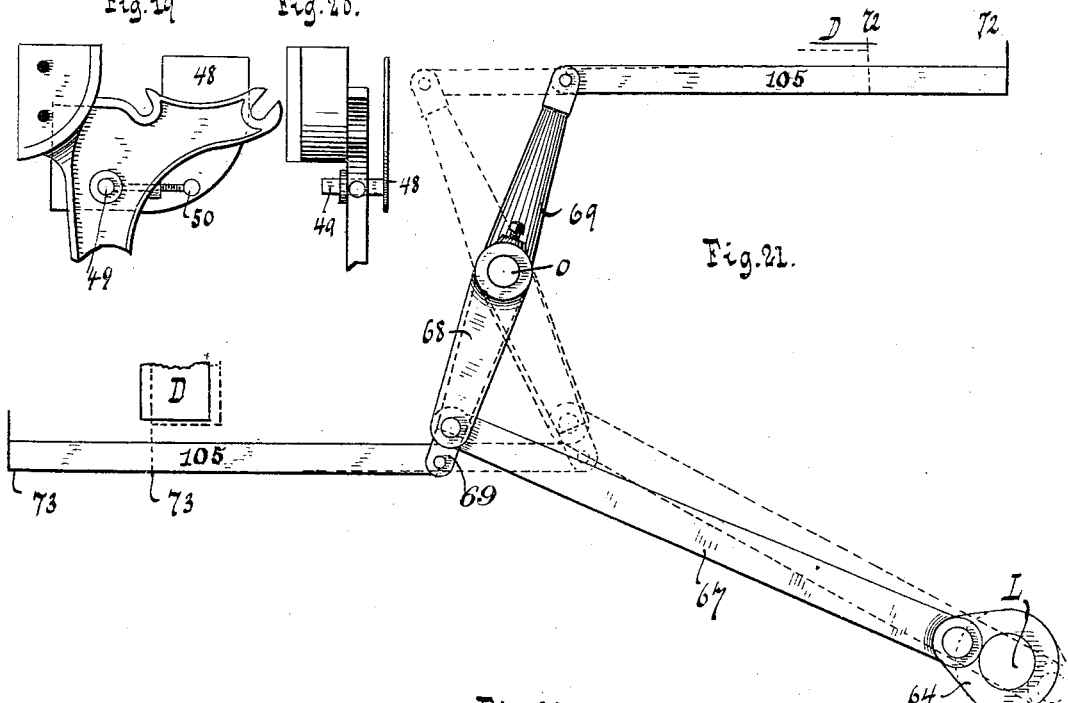
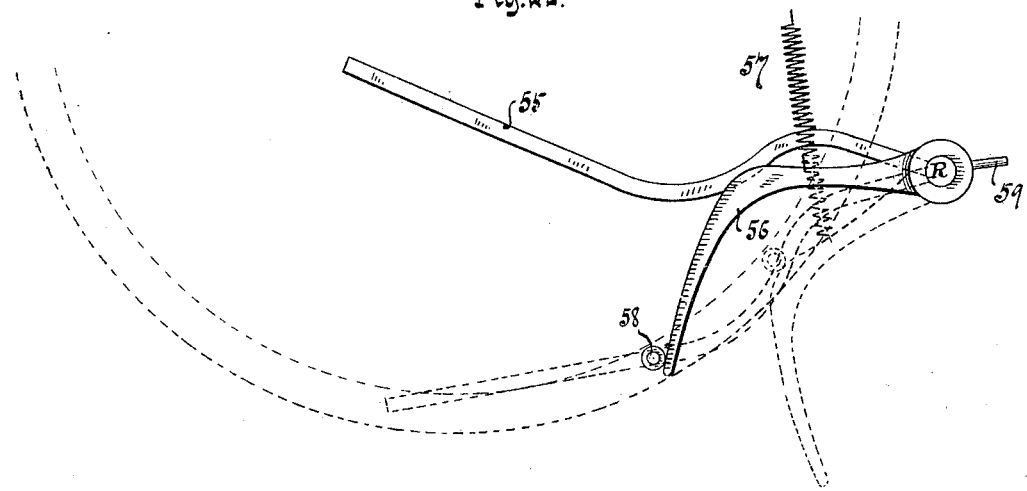
WITNESSES:
INVENTOR
Gustav L. Jaeger
BY
ATTORNEYS (No Model.) 9 Sheets—Sheet 9.

G. L. JAEGER.
EGG TRAY MACHINE.

No. 369,944. Patented Sept. 13, 1887.

WITNESSES:
Gabriel J. W. Galster
William Miller

INVENTOR
Gustav L. Jaeger
BY
Van Santvoord & Hauff
ATTORNEYS

N. PETERS, Photo-Lithographer, Washington, D. C.

UNITED STATES PATENT OFFICE.

GUSTAV L. JAEGER, OF NEW YORK, N. Y., ASSIGNOR TO BENJAMIN C. FAUROT, OF LIMA, OHIO.

EGG-TRAY MACHINE.

SPECIFICATION forming part of Letters Patent No. 369,944, dated September 13, 1887.

Application filed January 21, 1886. Serial No. 189,351. (No model.)

*To all whom it may concern:*

Be it known that I, GUSTAV L. JAEGER, a citizen of the United States, residing at New York, in the county and State of New York, have invented new and useful Improvements in Egg-Tray Machines, of which the following is a specification.

My invention relates to machines for making egg-trays or cell-cases to be used in packing eggs or other objects for transportation.

The object of my invention is to improve and simplify the construction and operation of such machines, to make the same more efficient, and to enable one to make different kinds of trays on the same machine. Some of my improvements relate to the class of such machines to which the machine shown in United States Letters Patent No. 252,264, dated January 10, 1882, belongs.

The several features of my improvement are described and pointed out in the following specification and claims, reference being had to the accompanying drawings, consisting of nine sheets, of which—

Figure 1:
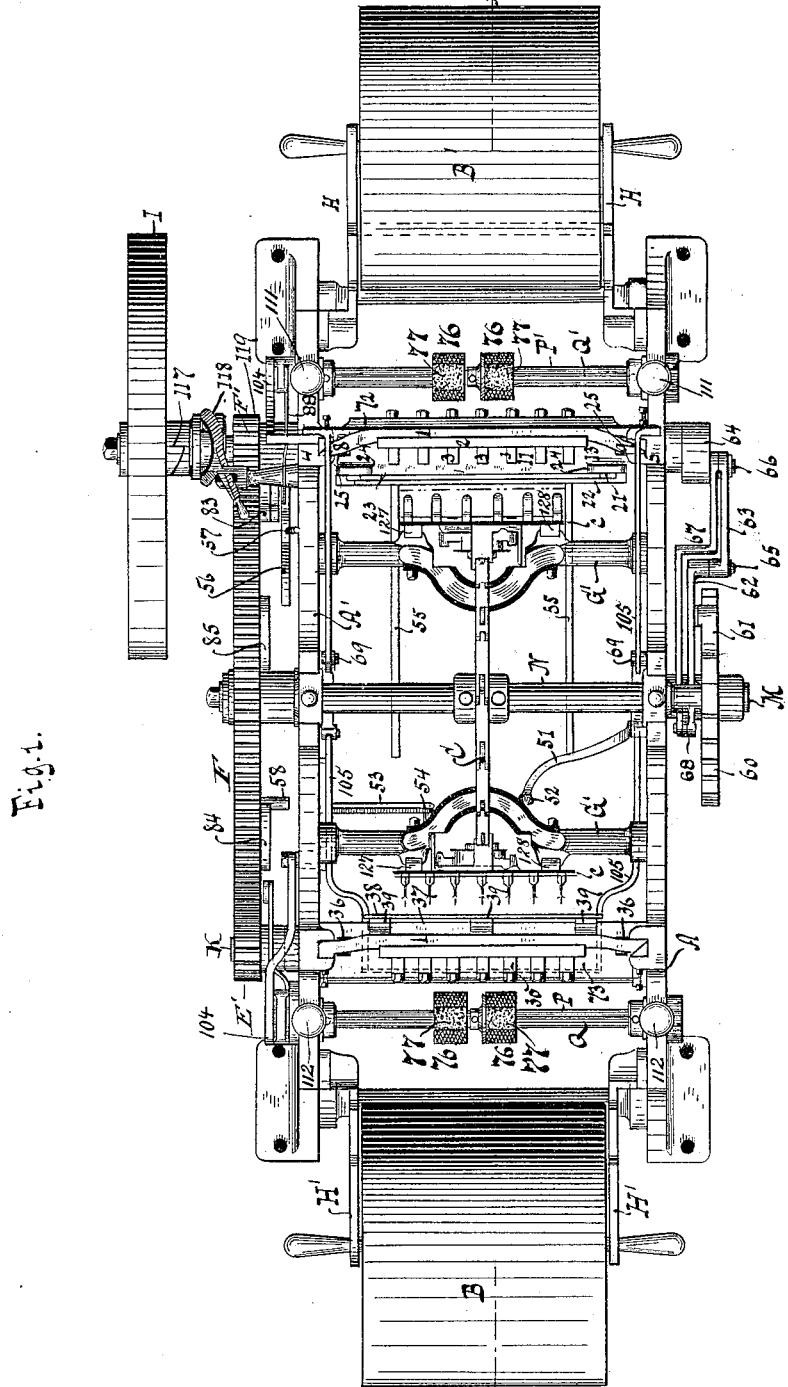
Figure 2:
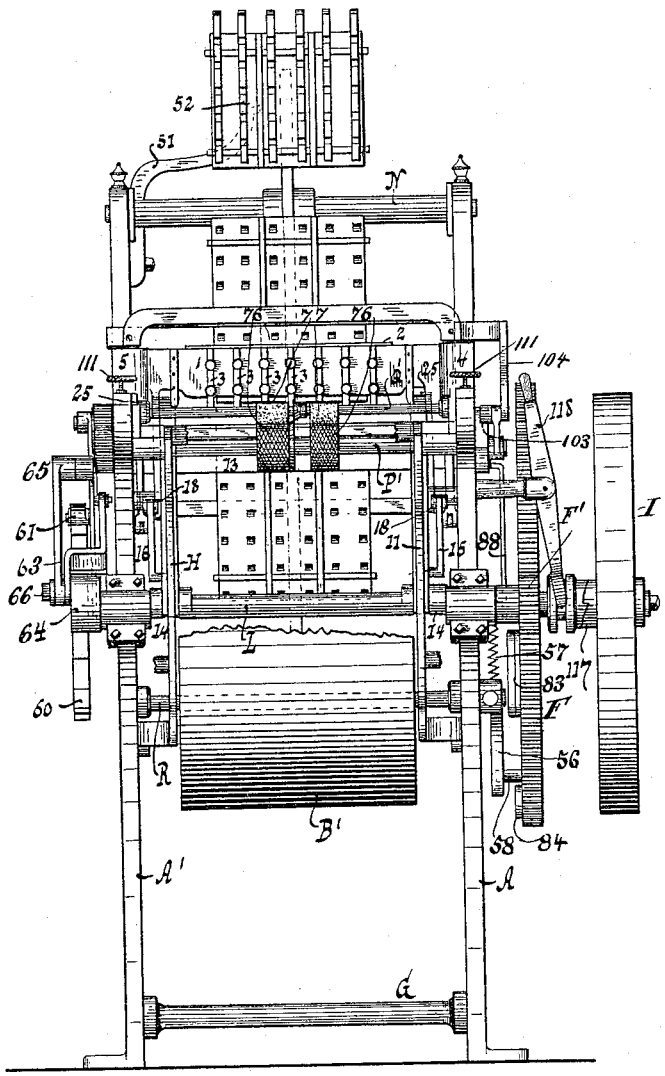
Figure 3:
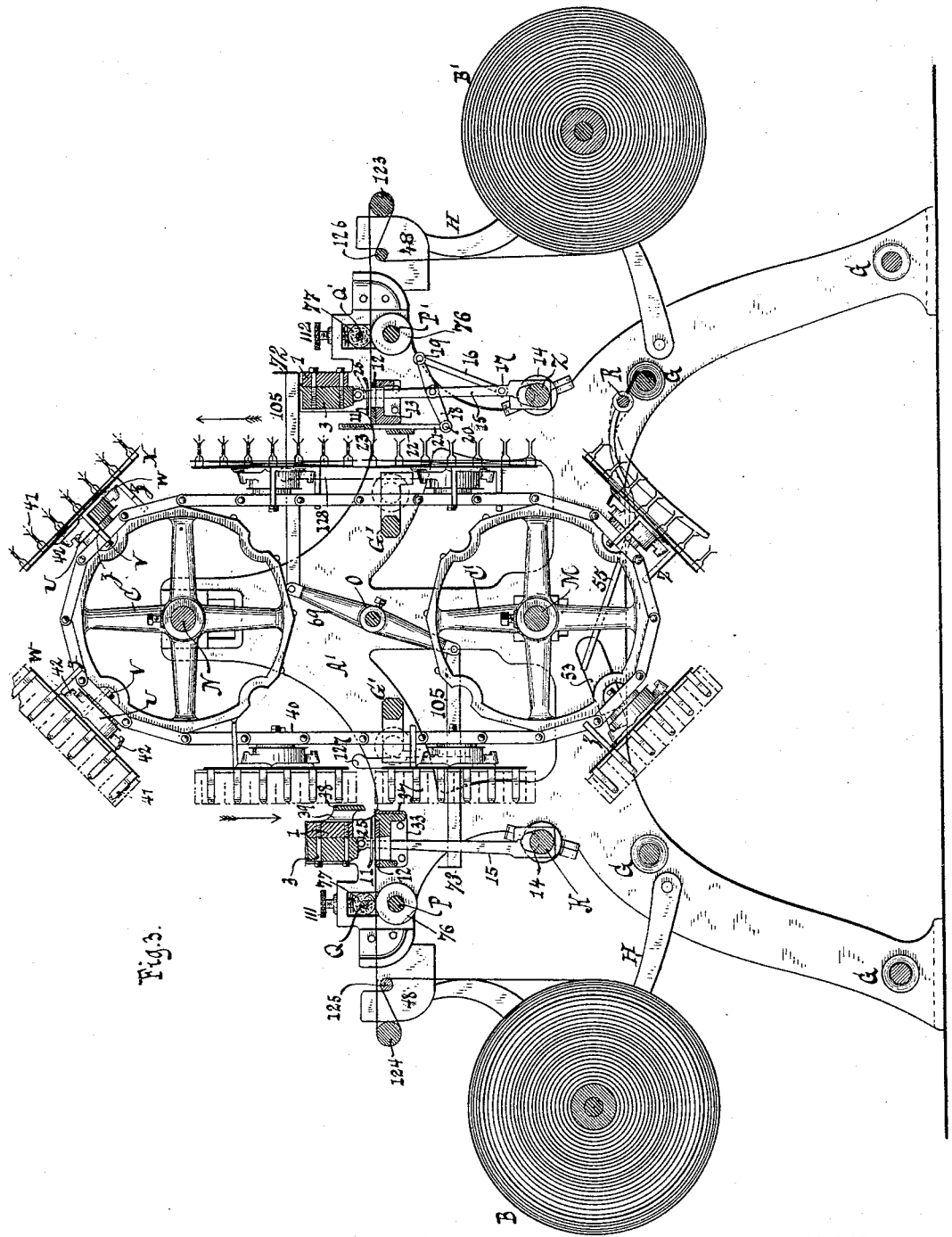
Figure 4:
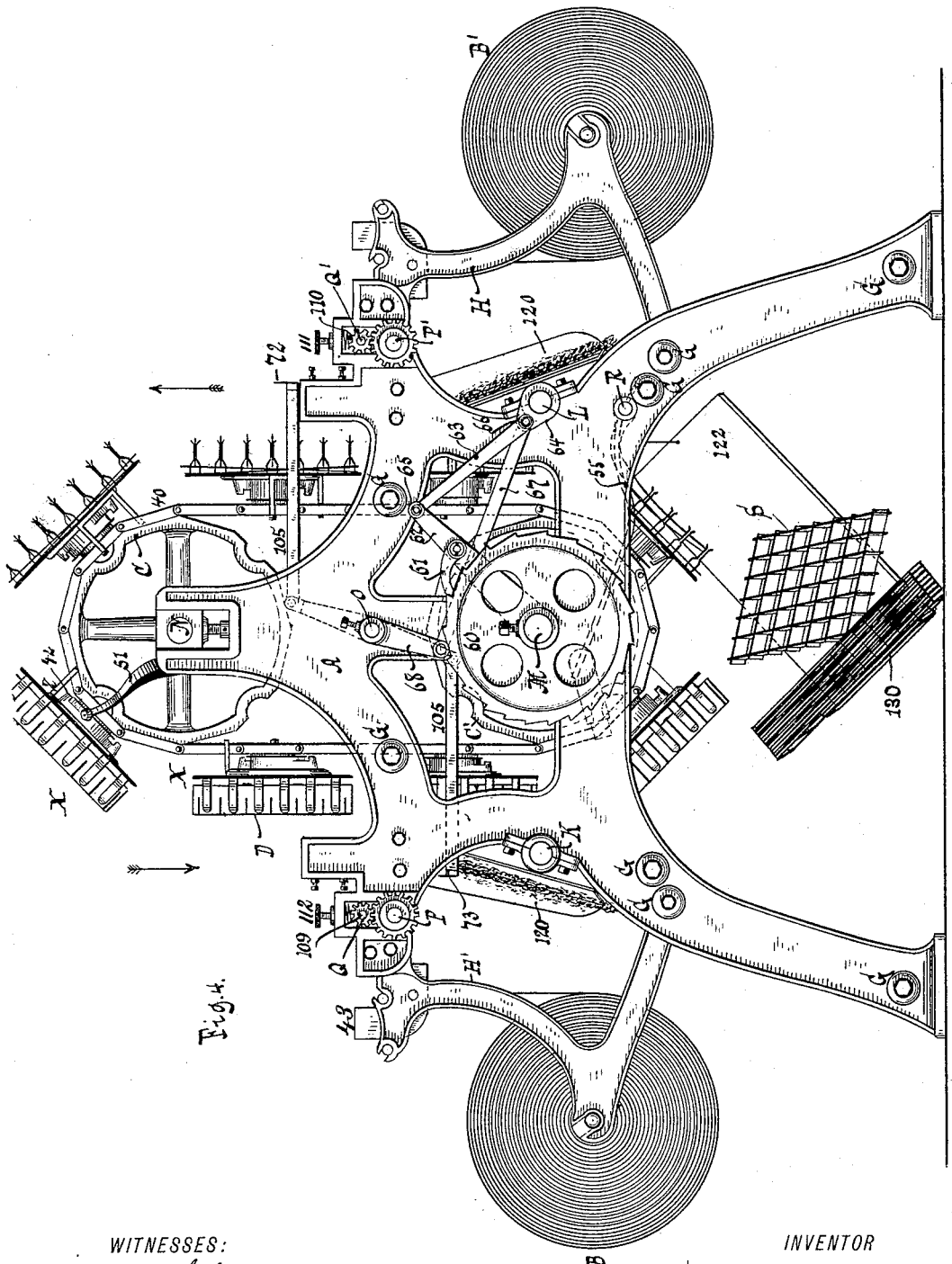
Figure 8:
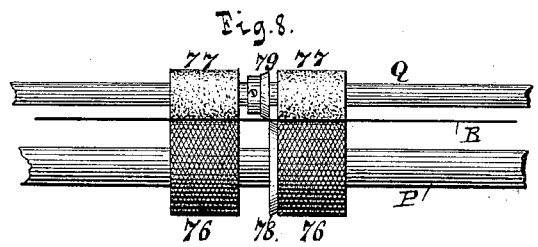
Figure 16:
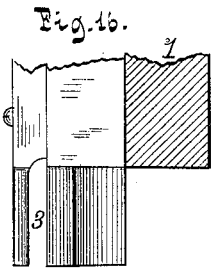
Figure 13:
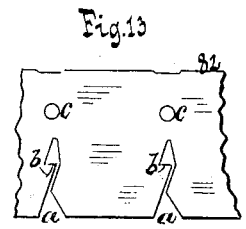
Figure 9:
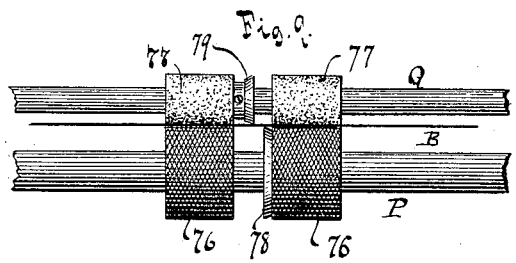
Figure 17:
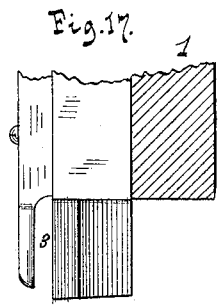
Figure 14:
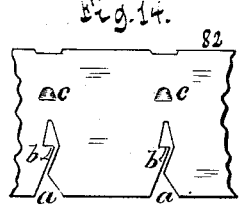
Figure 15:
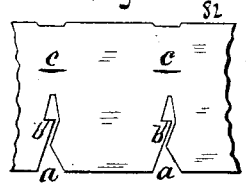
Figure 10:
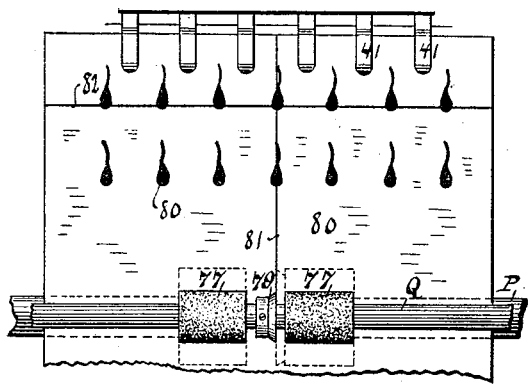
Figure 18:
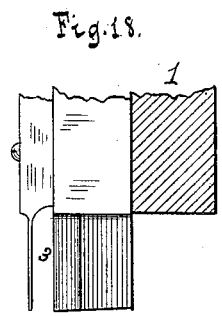
Figure 11:
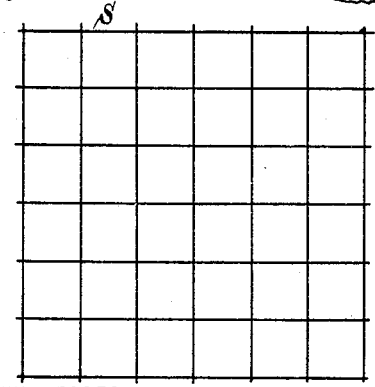
Figure 12:
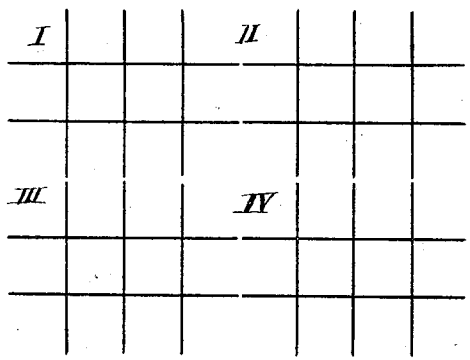
Figure 23:
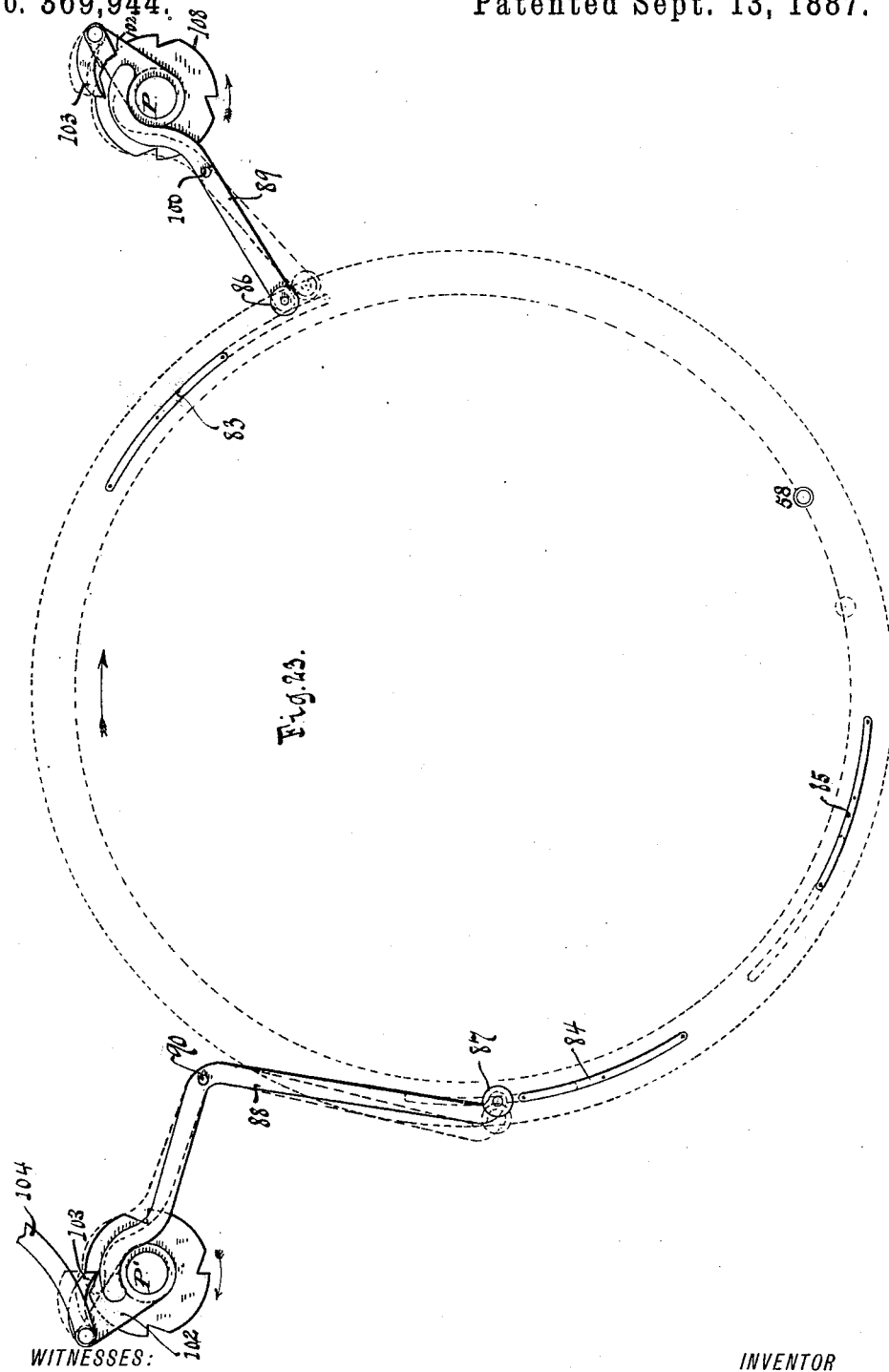

Figure 1 is a plan view of my improved machine, the guiding and straightening rollers being omitted. Fig. 2 is an end elevation, having the roll of the straw-board partly broken away. The guiding and straightening rollers are omitted in this elevation. Fig. 3 is a longitudinal section on the line $x$ $x$ of Fig. 1. Fig. 4 is a side elevation of the machine looking toward the right-hand side of Fig. 1. Fig. 5 is a side elevation of the left-hand side of Fig. 1, the pulley I being removed. Fig. 6 is a side elevation of one of the platforms on which the trays are built up. Fig. 7 is a rear view thereof. Fig. 7ª is an elevation of one of the catches W detached from its platform X. Fig. 8 is a front elevation of one set of feed-rollers with the cutters for slitting the board ready for cutting. Fig. 9 is a like elevation of the same feed-rollers with the cutters separated, so as to allow the board to pass without being cut. Fig. 10 is a plan view of the same feed-rollers, showing the cutters ready for operation and showing the straw-board and one of the platforms receiving in its fingers one of the strips or partitions. Fig. 11 is a diagram of an egg-tray made on the machine. Fig. 12 is a diagram showing smaller egg-trays, also made on the machine. Fig. 13 is part of a strip of straw-board, showing slots and holes made therein by the punches. Fig. 14 is a similar view, showing indentations or sockets formed or embossed on the strip instead of the round openings cut out in Fig. 13. Fig. 15 is another modification, where slits take the place of the round openings. Fig. 16 is a section of part of a punch and cross-head suitable for punching the strips, as shown in Fig. 13. Fig. 17 is a like section of a punch and embossing-tool suitable for punching and making cavities in the strips, as in Fig. 14. Fig. 18 is a like section of a punch suitable for punching the strips, as in Fig. 15. Figs. 13 to 18 are on a larger scale than the rest of the figures on the same sheet. Fig. 19 is a side elevation of one of the plates for directing the passage of the straw-board into the machine, and Fig. 20 is a front elevation thereof. Fig. 21 is a side elevation of the bottomer or pusher motion. The dotted lines show its position after having bottomed a strip and as ready to be withdrawn. Fig. 22 is a side elevation of the discharging motion for discharging the tray from the platform. The dotted lines show the position of the parts at the end of that action and as ready to be returned by their springs. Fig. 23 is an elevation showing the feed ratchets and pawls and the means for stopping the feed at the desired times.

Similar letters or numerals indicate corresponding parts.

The letters A A' designate the sides of the frame of my improved machine.

G G' are stationary cross-bars, which connect the sides of the frame. The ends of the frame are provided with suitable arms, H H', which support rolls B B' of straw-board or other suitable material, from which the trays are formed.

The straw-board is conducted from the rolls to the feed-rollers over guiding and straightening rollers 125 and 124 at one end of the machine and 126 and 123 at the other end, whereby the material, which by being wound in the form of rolls acquires a curved form, becomes straightened by reason of reversed curvatures. The curvature of the straw-board upon its roll varies with the diameter, and for this reason I first impart to the straw-board a uniform curvature by passing it over a roller, 125 or 126, the diameter of which is about the same or smaller than the diameter of the cores of the rolls B B'. I then pass the board with its opposite side over a roller, 124 or 123, having preferably a somewhat larger diameter than rollers 125 or 126, which rollers 124 or 123 curve the straw-board in the opposite direction, the combined effect being a substantial straightening of the straw-board. The journals of the rollers 124, 125, 126, and 123 have their bearings in the arms H H', and the tops of the rollers 124 123 are about level with the tops of the lower feed-rollers. The feed-rollers (shown detached in Figs. 8 and 9) consist of a lower metallic roller, 76, whose circumference is milled or grooved to prevent the paper from slipping on it, and an upper press-roller, 77, having a surface of india-rubber or other suitable material.

P Q P' Q', Figs. 1, 3, and 4, are the shafts of the feed-rollers 76 77. Their journals are placed in boxes in the frame, one over the other, and the upper roller is held down upon the lower roller by a yielding pressure produced in this example by spiral springs 109 110, Fig. 5, which are compressed by adjusting-screws 111 112, that work through the tops of the boxes. The shafts of the rollers 76 77 are geared together at one end, (see Figs. 2 and 4,) and at the other end the shafts of the lower rollers, 76, are provided with ratchet-wheels 108, Figs. 5 and 23, by means of which and of pawls 103 they are turned in the proper direction and at the proper times, as hereinafter explained, to feed the straw-board from the rolls B B' into the machine.

It will be seen that each end of the machine is provided with similar feed-rollers, 76 76, and with similar straightening-rollers, the straightening-rollers at the left-hand end of the machine, Fig. 3, being marked 124 125, while those at the other end are marked 123 126.

F is a spur-wheel interposed between pinions E' F', placed upon the ends of the crank-shafts K L, which operate the punches and knives. One of these two shafts—namely, the shaft L—I use, by preference, as the main shaft. The driving-pulley I is mounted loosely on the shaft L, and is engaged therewith by a sliding clutch, 117, of the usual construction, for throwing the machine in and out of action. The driving-pulley may receive its motion from a counter-shaft. The punches and knife on the right-hand end of the machine, observing Fig. 3, are operated by means of cranks 14, situated on the main shaft L between the sides of the frame, and from a crank, 64, Figs. 1, 4, and 21, situated on the same shaft, L, outside of the frame, are derived the movements of the sprocket-wheels C C and endless chain 40, and also the movements of the bottomers and of the feeding devices at each end of the machine.

The punches and knife on the left-hand end of the machine, observing Fig. 3, are operated from a crank, 14, situated on the crank-shaft K between the sides of the frame. The intermediate spur-wheel, F, turns loosely upon one end of a shaft, M, which has its bearings in the sides of the frame, and upon the other end of the shaft M is fixed the ratchet-wheel 60, by means of which intermittent motion is given to that shaft through the pawl 61, which is actuated from crank 64 of the main shaft L. (See Figs. 1 and 4.)

On the same shaft, M, but within the frame of the machine and midway between its sides, is secured the lower sprocket-wheel, C', which is engaged by the links of the endless chain 40, which extends around both the wheel C' and the upper sprocket-wheel, C, the latter being mounted upon a shaft, N, whose journals are placed in boxes adjustably supported in the sides of the frame, so that the chain can be properly tightened. The teeth of the ratchet-wheel 60 are engaged by the pawl 61, which is pivoted to the vibrating arm 62, which turns loosely on the shaft M. The arm 62 is vibrated from crank 64 of the shaft L by means of link 63, which is pivoted at one end to the crank-pin 66 and at the other end to pin 65 of arm 62. (See Figs. 1 and 4.)

The ratchet-wheels 108 upon the shafts of the lower feed-rollers at both ends of the machine are driven by pawls 103, Fig. 23, which are pivoted to the ends of arms 102, which turn freely on the shafts P P'. The ends of the arms 102 are connected by bars 104 to one of the reciprocating bottomer-bars 105 at each end of the machine, so that the reciprocations of the bottomer-bars are employed to operate the pawls and ratchets of the feed mechanisms.

The bottomer-bars 105 are properly supported in the machine, and each pair, there being two for each end of the machine, carry at their outer ends a bottomer or pusher, 72 73, consisting of a narrow plate of a length a little greater than the length or breadth of the platforms on which the strips or partitions are assembled, set so that its flat face will bear against the strips to drive them home into the spring-fingers of the platforms. The inner ends of the bottomer-bars 105 are pivoted to the ends of vibrating arms 69, (see Figs 1, 3, and 21,) which are rigidly mounted at the middle of their length upon the rock-shaft O, which receives a rocking motion from the main shaft L, through its crank 64 and the link 67, which link 67 connects the end of crank 64 to a rocker, 68, fixed upon the shaft O between the frame A and the ratchet-wheel 60.

To the endless chain 40, at suitable points, are attached by bolts V, Figs. 6 and 7, platforms or forms X, upon which are assembled the strips or partitions D that go to form the trays S. The platforms X are eight in number in the machine represented. They consist of plates T, Fig. 6, which are secured on one face upon a hub, U, from opposite sides of which project two arms, 42 42. The opposite sides or faces of the plates T are provided with rows of elastic double fingers 41, made of metal with flaring ends, and so placed as to allow the strips or partitions to be forced in between them. This placing or assembling of the strips D upon the fingers of the platforms is accomplished by the feed-motion and by the pushers or bottomers 72 73. The straw-board is fed by the feed-rollers (see among others Figs. 1 and 3) to the punches 3 and knife 22, by which the straw-board is punched out and a strip severed along the line 82 from the end of the straw-board, as is indicated in Fig. 10; but the punches and knife do not come into action until the end of the straw-board has been shoved by the feed-motion part way into the fingers, as is indicated in Fig. 10, and the movement of the punches and knife that are on the same end of the machine are so timed that the punches act a little before the knife acts, and the punches are so set that they cut beyond the place of the parting-line where the cut of the knife will come, and cut a little distance into the plain edge 82 of the several strips, as indicated by the recesses along that edge in Figs. 13, 14, and 15, the knife intersecting the openings made by the punches. The object of so setting the punches that their ends extend beyond the parting-line 82 is to insure that the openings $a$ shall extend through the appropriate edges of the strips. The punches 3 are arranged upon the cross-heads 1, whose ends move in V-shaped guides 4 and 5 in the frame, and below the punches is a die-plate, 12, upon which the straw-board is supported when the punches act upon it, the punches passing through a stripper-plate, 11, placed over the die-plate, which strips the board from the punches as they ascend. The cross-heads 1, which carry the punches, are reciprocated by means of bars 15, connected to the cross-heads by joints 25 and pivoted to the cranks 14 on the shafts L and K. The knife 22 acts upon the paper from below in that end of the machine which is represented at the right-hand end of Fig. 3, cutting it against the upper stationary knife, 23, the motion of knife 22 being derived from shaft L through the cranks 14, links 16, pivoted to bars 15, fulcrum-bars 18, which are pivoted at their centers to the frame, (see Figs. 2 and 3,) and knife-bars 21. On the left-hand side of the machine, Fig. 3, the knife 38 is attached to the cross-head 1 by brackets 39, and it cuts against the stationary knife 37.

The fingers 41 of the platforms X are arranged in this example in seven rows, each row having six fingers, and when a strip has been fed to the fingers, as indicated in Fig. 10, the movement of the platform, which is intermittent, is resumed and the next row of fingers is brought up to the level of the feed, when the edge of the straw-board is fed past the punches and knives into a fresh row of fingers, the preceding row of fingers having meanwhile been carried upward above the punches and knives, and is in its turn brought opposite to the pusher 72, which in its reciprocations is brought against the edge of the strip D, and the strip is thereby forced home between the spring-fingers.

The operation of feeding the board to the fingers, of punching and cutting off the strips, and forcing them home into the fingers of the platforms is continued, all of the motions being intermittent, until the row of fingers of the platform are supplied, when a fresh platform is brought up by the chain and is supplied with strips, as already explained.

The operation of the pusher-plates 72 73 will be readily understood on referring to Figs. 4 and 21, where it is shown that their motions at each end of the machine are derived from the main shaft L. The platforms X are separated from each other on the chain by such a distance that when two adjoining platforms are on a straight part of the chain the distance between the last row of fingers of the leading platform and the first row of fingers on the next following platform is the same as the distance from each other of the rows of fingers on the platforms, so that there is no interruption in the progress of filling the platforms by reason of the distance of the platforms from each other. The platform is carried up by the chain over the upper wheel, C, and when beginning to descend on the other side of the wheel one of its arms 42 strikes against the roller end 52 of a stationary arm, 51, and the platform is thereby turned on its axis one-quarter of a revolution to the position shown in Fig. 4, where the platform, which is near arm 51, is represented as having been turned one-quarter of a revolution as compared with the position of the platform next to it toward the right side of the figure. By means of this quarter-turn of the platform the strips D, which were carried along up to that point in horizontal positions, are turned so as to be in vertical positions, in which last-named positions they are presented to the feeding apparatus, which supplies the cross strips or partitions to the platform and completes the tray.

The hubs U of the platforms X rest upon spring-plates 44, which are interposed between the bottoms of the hubs and the upper face of a projection, 45, formed on the links to which the platforms are fastened. The spring-plates 44 should be of steel, the construction being such that the fastening-bolt V, which passes through the platform, the hub, the spring-plate, and the link, with its projection, holds the parts together and presses the projecting part 45 of the link against the spring 44, so as to create the necessary friction between them to prevent the platform from turning on the link, except by positive force produced by the contact of the advancing platform with the stationary arm 51.

In order to provide additional security that the platforms shall be brought to the proper position in making the quarter-turn and shall be held in that position while passing the feeding devices, I have provided on the back of the platforms curved catch-plates W, rigidly secured thereto. The catch-plates W extend partly around the hubs U, (see Fig. 7,) and are arranged in such positions that the notches Y Y, with which they are provided at their two ends, will be alternately engaged by the chain 40 after the platforms have received their quarter-turns and as the links leave the sprocket-wheels and the chain is being straightened. The notches are made with flaring sides for the purpose of facilitating the entrance of the chain. The central part of the catch-plate W is flat, while the notches Y Y are formed in projections, the inner sides, Z' Z', of which are made shorter than the outer sides, Z Z, so that when the platforms receive their quarter-turn movement the longer projections, Z Z, will prevent the platforms from being turned too far and will act as guides, while the inner shorter projections, Z' Z', are just long enough to pass the chain while the platform is turned in its position over the sprocket-wheel; but as the chain becomes straightened between the sprocket-wheels it enters the notch Y and holds the platform in the proper position while passing the feeding device. As the platform passes from the straight part of the chain to the sprocket-wheels, the chain becomes disengaged from the notches and the platform is ready to be turned back a quarter-turn. In Figs. 6 and 7 the chain 40 is supposed to be in the notch Y at the left-hand side of those figures. The next quarter-turn which takes place (observing those figures) will oscillate the platform and catch-plate W and cause the right-hand notch to swing around over the chain to receive the chain as the same is being straightened. The notches are wide enough to permit the chain to pass in and out readily.

The bolt V has a screw-thread on its end, and is secured by a nut and lock-nut, 46. The end of the stationary arm 51 is preferably provided with a friction-roller, 52, where it comes against the hubs of the platforms. The platforms X when descending (observing Figs. 3 and 4) present the series of strips which have been inserted in its fingers in proper position for the reception of the series of cross strips or partitions, which complete the trays.

The character and shape of the perforations or impressions made in the straw-board by the punches and embossing-tools are shown in Figs. 12, 13, 14, and 15, where *a* designates the flaring opening on the edges of the strips, and *b* a hook formed in the passage above the flaring opening, and *c* a hole or depression or slit above the hook. Each strip or partition is provided with similar openings and hooks with holes, depressions, or slits, so that when the different series of strips are presented to each other with their openings *a* facing each other they will interlock, the hooks *b* of one engaging the holes or depressions or slits *c* of the other. This construction enables the strips or partitions made on the left-hand end of the machine, observing Figs. 3 and 4, to interlock with those previously made and placed on the platforms at the right-hand end of the machine, it being only necessary that the last-mentioned strips shall, as the platforms descend and come opposite the feeding devices at the left-hand side of the machine, present their punched sides outward, while the other strips when presented and fed to them have their openings in a reversed position, so that the strips may interlock with each other.

Any other suitable forms of openings or depressions may be employed for interlocking the strips, and the punches, slitters, and embossing-tools may be shaped accordingly. The embossing-tools may be formed so as to produce corrugations in the strips, or any other desired form of embossing, and the strips be thereby stiffened or strengthened.

The arrangement of parts in respect to the rolls of straw-board B, the straightening-rollers 124 125 and 123 126, the feed and press rollers, the punchers, cutters, and bottomers or pushers, together with the devices by which those parts are moved and operated, is substantially the same at the left-hand end of the machine as at the right-hand end, observing Figs. 1, 3, and 4, except that the knife 38, which cuts the strip off from the straw-board at the left-hand end, is above the straw-board and is directly attached to the puncher cross-head 1 by brackets 39, while the lower knife, 37, is stationary and the bottomer or pusher is arranged below the level of the punches and knives instead of above them.

The waste produced by the punches is conducted out of the machine at each end by means of chutes 120, Fig. 4. Each platform is supplied with a second series of strips as it moves past the feeding devices on the left end of the machine, Figs. 3 and 4, such second series consisting of seven strips or partitions, and the trays are thereby completed and ready to be removed from the platform. Before the removal of the trays the platforms receive a quarter-turn by reason of the contact of the hubs with the lower or stationary arm, 53, Figs. 1 and 3, on the end of which is an anti-friction roller, 54, and which, as in the case of the upper stationary arm, 51, is struck by one of the arms 42 of the platform, and the platform is consequently turned back again a quarter-turn, in which position it is then locked, as the chain becomes straightened, as before explained, in readiness for the feeding device on its ascent. The further movement of the platform, before its ascent, brings it over the diagonally-inclined receiving-table 122, which is placed beneath the discharging apparatus, which consists of two arms, 55, secured to a rock-shaft, R, at such a distance apart as enables them to move past the platforms, just clearing their ends, but so that they will strike the projecting ends of the trays and remove them from the platforms. This movement of the dischargers 55 is effected by the roller-pin 58, Figs. 1 and 22, mounted on the side of the gear-wheel F, which pin strikes against a cam, 56, Figs. 5 and 22, that is also secured to the rock-shaft R, and by rocking the shaft gives the proper motion at the proper time to the dischargers 55. The projecting ends of the strips of the tray S receive the blow of the discharger-arms 55, whereby the whole tray is thrown out.

The receiving-table is not only inclined with respect to the longitudinal axis of the machine, but also with respect to its transverse axis, so that the tray S, falling upon the table, takes a diagonal position on the same, as shown in Fig. 4, and in its descent will collapse and fold together, as indicated in that figure. The lower end of the table 122 is provided with a flange, 130, projecting from it at right angles with its surface, so as to act as a stop to the trays and cause them to fold up, as shown in the drawings. After the roller-pin 58 has passed over the cam 56, said cam and the arms 55 are restored by springs 57 from their positions shown in dotted lines, Fig. 22, to their normal position, (shown in full lines,) ready to act on the tray on the next platform. The discharger-arms 55 are prevented from being drawn back too far by the springs by means of projections 59, which extend from the rock-shaft R and strike against a cross-bar, G, of the frame.

The platforms, while they are receiving the strips or partitions from the feeding devices, are supported from behind against the thrust of the feed by projecting bars 127 128, secured on the crooked cross-bars G G'. (See Fig. 1.)

The pitch diameters of the intermediate wheel, F, and of the pinions E' F', I make of such proportions that for each revolution of the wheel F a platform at each end of the machine shall have been provided with strips or partitions by the feeding devices, whereby I am enabled to use the same gear-wheel, F, for operations which are to be repeated on the platforms in the same succession and order on both ends of the machine, or in one order or succession on one end and in a different order or succession on the other end of the machine.

Ordinary trays or cell-cases have thirty-six cells, calling for seven strips in each direction, and by having the pitch diameters of said gear and pinion in the proportion of seven to one I am enabled to use the gear F for operations repeated once in a given succession for each platform.

When this machine is used for making trays or cell-cases with thirty-six cells on each platform, the partitions having projecting ends, the punches and knives make seven cuts and prepare seven strips or partitions for each platform, which are fed by the feed-motion. If, however, it is desired to make different forms of trays—that is to say, trays or cases of a less number of strips or partitions—upon the same machine, I accomplish that object by controlling the feeding and interrupting it at certain stages, while the movements of the chain and platform on it proceed. For example, when it is desired to make trays or cell-cases such as those designated I II III IV in Fig. 12, each of them containing cells for one dozen eggs, but in which the outer cells are not closed by strips or partitions, as in the tray shown in Fig. 11, but are closed by the sides of the box in which they are to be placed for transporting, four such trays may be formed upon each platform. In order to make four such trays at one time upon my machine, I take straw-board of a width double that of the shorter or three-cell strips of Fig. 12, and adjust the rotary cutter 79 upon the press-roller shaft (see Figs. 8 and 9) to such a position that it will co-operate with the cutter 78 on the feed-roller shaft to cut the straw-board lengthwise or in the direction of the feed, as indicated by the line 81 in Fig. 10. If desired, however, two rolls of straw-board of the width of three cells may be placed on the roll-shaft and the cutters 78 79 may be omitted.

Comparing Fig. 12 with Fig. 11, it is seen that of the first series of strips, being the series which occupy vertical positions in Fig. 12, the fourth strip is absent from said Fig. 12, and that of the second series of strips, being the series which are represented by the horizontal lines of Fig. 12, the first, fourth, and seventh strips are absent, and that both series are cut in two in lines corresponding to the positions in Fig. 11 of the fourth strip of each series.

In the operation of the machine in producing four such trays as those marked I II III IV in Fig. 12 on the same platform, the first three strips of the first series will be inserted in the first three rows of fingers of the platform, but the fourth row of fingers will pass the feed without receiving a strip, because the feed will have been stopped at the time that that row of fingers is opposite the feed. The feed then resumes its movements and supplies the following three rows of fingers with strips. The platform is then carried along by the chain over the upper sprocket-wheel, and before it reaches the feeding devices on the opposite end of the machine it receives a quarter-turn, as before explained. The strips or partitions of the second series, which are now to be supplied to the platform, will interlock the strips or partitions, which are held in the fingers of the platform, and which, by means of the quarter-turn, are presented, as shown in Fig. 12, vertically to the feed, with their flaring edge openings, a, in the same plane horizontally as the straw-board, their openings being also directly opposite the openings in the edges of the second series of strips. The feed is stopped from time to time during the intervals when the places of the first, fourth, and seventh strips of the second series are presented before the feeding device, and is operated when the places of the second, third, fifth, and sixth strips of that series are presented to the feed, so that only the second, third, fifth, and sixth of the second series are fed and interlocked with the strips or partitions of the first series.

For making smaller trays, as illustrated by Fig. 12, the width of the straw-board is greater for the second series than for the first series.

As above described, the trays, Fig. 11, are removed by two discharging-arms, 55, striking against the projecting ends of the strips of the first series; but when smaller trays, as shown in Fig. 12, are made on one platform, the trays cannot be successfully removed by the arms 55 striking against the projecting ends of the strips of the first series, and means must be provided for pushing out the inner ends of said strips. This I accomplish by a central discharging-bar, 7, which is raised by two metal strips, 47, against the projecting ends of which the dischargers 55 strike. The discharging-bar 7 is secured to the strips 47 by pins passing through oblong holes $g$ in the bar 7, so as to allow for small variations in the distance of the bars 47. To each one of the two metal strips 47 is riveted one end of a flat spring, 6, or of two or more such springs, the opposite ends of the springs 6 being secured to the platform by rivets 8 in such a manner that the springs 6 and the strips 47 are held against the platform, as shown in full lines in Fig. 6, unless raised off by the discharging-arms 55 striking against the outer ends of the strips 47, when the springs 6, strips 47, and discharging-bar 7 will assume the positions indicated in dotted lines in Fig. 6. Thus while the discharging-arms 55 act upon the outer ends of the strips of the first series, Fig. 12, the discharging-bar 7 acts upon the inner ends of said strips, the trays being removed by their combined action. After the dischargers have performed their office, the springs 6, strips 47, and bars 7 will return to their positions. (Shown in full lines in Fig. 6.) This arrangement can also be used for removing the large trays, Fig. 11.

The means which in this example I have used for stopping the feed at the time required are substantially the same for both ends of the machine, and are as follows: On one side of the gear-wheel F are arranged cams 83 84 85, (see Figs. 1 and 23,) which are secured in proper positions, according to the time when they are desired to act to stop the feed. These cams are by the rotation of the gear F brought against one end of the levers 88 and 89, which are pivoted to the frame of the machine, the upper ends of the levers being curved so as to form shoes, that lie over the hubs of the arms 102, on whose ends the pawls 103 are placed. The shoes of the levers 88 and 89, when in their normal positions, as seen in full lines in Fig. 23, lie under the pawls 103 and allow the pawls to engage the teeth of the ratchet-wheels 108 when the pawl-levers are vibrated. When one end of the cams 83, 84, or 85 comes against the end of the lever 89, which is provided with an anti-friction roller, 86, the lever is turned on its pivot 100, so as to raise its shoe and cause it to lift the pawl 103 out of engagement with the ratchet, as shown in dotted lines in Fig. 23, so that the feed-roller will not be rotated, and consequently the feeding is stopped while the cam is acting on the lever 89. One of these three cams projects farther from the wheel F than the other two, and acts upon the lever 88, which is arranged for operation, in connection with the feed mechanism, on the left-hand end of the machine, Fig. 5, and turns on the pivot 90, and which has its friction-roller 87 farther away from the wheel than the lever 89, so as to be acted upon by one cam only, while the lever 89 is acted upon by all three cams, so that the feed is stopped but once and at the proper time during the ascending motion of a platform and three times during the descending motion.

The straw-board is guided along its edges as it passes into the machine from the rolls B by the vertical guiding-plates 48, (seen at each end of the machine,) and which are adjustable on the frame by means of the bolts 49 and screw 50 for different widths of straw-board, as shown in Figs. 19 and 20.

In order to produce trays of different kinds, as hereinbefore referred to, it is only necessary to throw the feed stop-motion into or out of action and to adjust the guides 48 to the width of the straw-board without altering the machine.

My invention for stopping the feed by means of cams on the spur-wheel F is applicable to other feed-motions—as, for instance, it may be used in controlling and stopping the feed in said Patent No. 252,264—the modification requiring only the exercise of mechanical skill.

What I claim as new, and desire to secure by Letters Patent, is—

1. The combination, with the feeding-roller 76, of the device for stopping its movements, consisting of the cams 83, 84, and 85 on gear-wheel F, and lever 89, for lifting the driving-pawl 103 out of engagement with the ratchet 108, substantially as described.

2. The combination, with the platforms X, single chain 40, and means, substantially as described, for giving a quarter-turn to the platforms, of the catch-plates W, substantially as described.

3. The dischargers 55 upon the rock-shaft R, in combination with the cam 56 and pin 58 on spur-wheel F, substantially as specified.

4. In combination with the dischargers 55, the central discharging-bar, 7, supported by strips 47, which strips project beyond the platform, so as to be acted upon by the dischargers 55, and springs 6, secured to the platform and to the strips 47, substantially as specified.

5. In an egg-tray-machine, the combination of the platforms X, movable regularly onward with a step-by-step motion, with mechanisms, substantially as described, for cutting, preparing, and feeding the strips of material, the feeding mechanism for the strips being interrupted at fixed intervals while the movements of the platforms proceed, for the purposes set forth.

In testimony whereof I have hereunto set my hand and seal in the presence of two subscribing witnesses.

GUSTAV L. JAEGER. [L. S.]

Witnesses:
JOHN VAN SANTVOORD,
E. F. KASTENHUBER.